United States Patent [19]

Hirota

[11] Patent Number: 5,093,054
[45] Date of Patent: Mar. 3, 1992

[54] METHOD FOR MAKING A REFLECTOR OF A SATELLITE BROADCASTING RECEIVING PARABOLIC ANTENNA

[75] Inventor: Kashichi Hirota, Hackioji, Japan

[73] Assignee: Kyowa Electric & Chemical Co., Ltd., Tokyo, Japan

[21] Appl. No.: 544,732

[22] Filed: Jun. 27, 1990

Related U.S. Application Data

[63] Continuation-in-part of Ser. No. 311,229, Feb. 15, 1989, abandoned.

[30] Foreign Application Priority Data

Mar. 31, 1988 [JP] Japan .................................. 63-79310

[51] Int. Cl.[5] ............................................. B29C 45/16
[52] U.S. Cl. .................................. 264/45.1; 264/129; 264/255
[58] Field of Search ........................ 264/255, 45.1, 129

[56] References Cited

U.S. PATENT DOCUMENTS

| 4,014,966 | 3/1977 | Hanning | 264/255 |
| 4,030,953 | 6/1977 | Rutschow et al. | 264/255 |
| 4,210,616 | 7/1980 | Eckardt et al. | 264/255 |
| 4,459,257 | 7/1984 | Baciu | 264/255 |
| 4,647,329 | 3/1987 | Oono et al. | 156/245 |
| 4,733,246 | 3/1988 | Rubin et al. | 343/912 |

FOREIGN PATENT DOCUMENTS

| 0298060 | 1/1989 | European Pat. Off. | |
| 2426343 | 1/1980 | France | 343/704 |
| 0149802 | 11/1981 | Japan | 343/912 |
| 0055708 | 4/1984 | Japan | 343/840 |
| 0223007 | 12/1984 | Japan | 343/840 |
| 0229503 | 11/1985 | Japan | 343/840 |

OTHER PUBLICATIONS

Pappas and Murphy, Encapsulating Precision Antennas in Plastic, (Electronics, 3/8/63).

Primary Examiner—Jan H. Silbaugh
Assistant Examiner—Brian J. Eastley
Attorney, Agent, or Firm—Frishauf, Holtz, Goodman & Woodward

[57] ABSTRACT

A method of making a reflector of a satellite broadcasting receiving parabolic antenna. The reflector includes a reflective plate which has a skin layer and a core layer disposed within the skin layer which are formed by sandwich injection molding. The skin layer includes a synthetic resin, and the core layer includes a synthetic resin which has pieces of an electric wave reflective material dispersed therein. The parabolic surface of the reflective plate is coated with a protective coating.

26 Claims, 2 Drawing Sheets

METHOD FOR MAKING A REFLECTOR OF A SATELLITE BROADCASTING RECEIVING PARABOLIC ANTENNA

This application is a continuation-in-part, of application Ser. No. 07/311,229 filed Feb. 15, 1989, now abandoned.

BACKGROUND OF THE INVENTION

The present invention relates to a reflector of a satellite broadcasting receiving parabolic antenna, and more particularly to a reflector including synthetic resin.

DESCRIPTION OF PRIOR ART

A parabolic reflector made of fibrous glass reinforced plastic (FRP) is known in the prior art. The parabolic reflector of FRP is formed by two sheets of a sheet molding compound (SMC) and one sheet of electric wave reflective material that are inserted into a compression mold with the reflective material sheet disposed between the two SMC sheets, and the sheets are heated and pressurized so that they are integrally formed to provide a reflective plate. Thereafter the parabolic surface of the reflective plate is coated with a protective coating.

As mentioned above, the method of manufacturing according to the prior art utilizes a compression molding. Portions of the reflector used for fixing it to a holding member (not shown) cannot normally be formed with a compression molding process because they project away from the compression molded surface (see flange 11 of FIG. 2, for example). Thus, such small fixing portions, must be formed after the compression molding.

In addition to a compression molding, the manufacturing of SMC sheets themselves and the subsequent forming of small portions are required, so it is difficult to manufacture a reflector quickly, easily and inexpensively. In this connection, it takes 5-6 minutes for a compression molding. So it takes much more than 5-6 minutes for the complete manufacturing process.

It is also proposed to manufacture a reflector by a method of conventional injection molding. However, since synthetic resin is mixed with electric wave reflective material, and then formed into a reflector, a fraction of the electric wave reflective material projects from the surface of the reflector, making the surface rough. This complicates the application of a surface protective coating after the forming of a reflector.

SUMMARY OF THE INVENTION

It is an object of the present invention to provide a reflector of a satellite broadcasting receiving parabolic antenna which has a smooth surface.

It is another object of the present invention to provide a method of manufacturing a reflector of a satellite broadcasting receiving parabolic antenna which is quick, easy and inexpensive and manufactures a reflector of the desired shape.

According to the present invention, the above and other objects can be accomplished by a reflector of a satellite broadcasting receiving parabolic antenna, comprising a reflective plate which has a skin layer and a core layer disposed within the skin layer. The skin layer includes a synthetic resin, and the core layer includes a synthetic resin which has pieces of electric wave reflective material dispersed therein, the parabolic surface of the reflective plate being coated with a protective coating.

In the reflector mentioned above, since the core layer (which has electric wave reflective material pieces dispersed therein) is disposed within the skin layer, the reflective material pieces do not project from the surface of the reflective plate, thereby providing a smooth surface for coating. Also, since the core layer has electric wave reflective material in it, the reflector has a high mechanical strength and a high reflectivity. Further, if the electric wave reflective material pieces are suitably shaped and sized, they do not interfere with the manufacturing of the reflective plate.

In a preferred embodiment of the present invention, the parabolic surface of the reflective plate is coated with a conductive coating, and the surface of the conductive coating is coated with a protective coating. Therefore, the reflector has a higher reflectivity because of the conductive coating.

The present invention also provides a method of manufacturing a reflector of a satellite broadcasting receiving parabolic antenna, comprising the steps of injecting first melted synthetic resin and second melted synthetic resin from first an second cylinders of an injection molding machine into the cavity of a mold, with the second synthetic resin being disposed within the first synthetic resin so that the completed reflective plate has a skin layer of the first synthetic resin and a core layer of the second synthetic resin. The second synthetic resin has electric wave reflective material pieces dispersed therein. The parabolic surface of said reflective plate is coated with a protective coating.

According to the method of manufacturing the reflector mentioned above, a first melted synthetic resin and a second melted synthetic resin (which has electric wave reflective material pieces dispersed therein) are injected into the cavity of a mold with the second synthetic resin being disposed within the first synthetic resin. Therefore, a reflector of the desired shape can be manufactured quickly, easily and inexpensively.

In a preferred embodiment of the present invention, a step may be included of coating the surface of the reflective plate with a conductive coating before a protective coating.

The above and other objects and features of the present invention will become apparent from the following description of preferred embodiments described with reference to the accompanying drawings.

DESCRIPTION OF THE PREFERRED EMBODIMENTS

Figure 1:
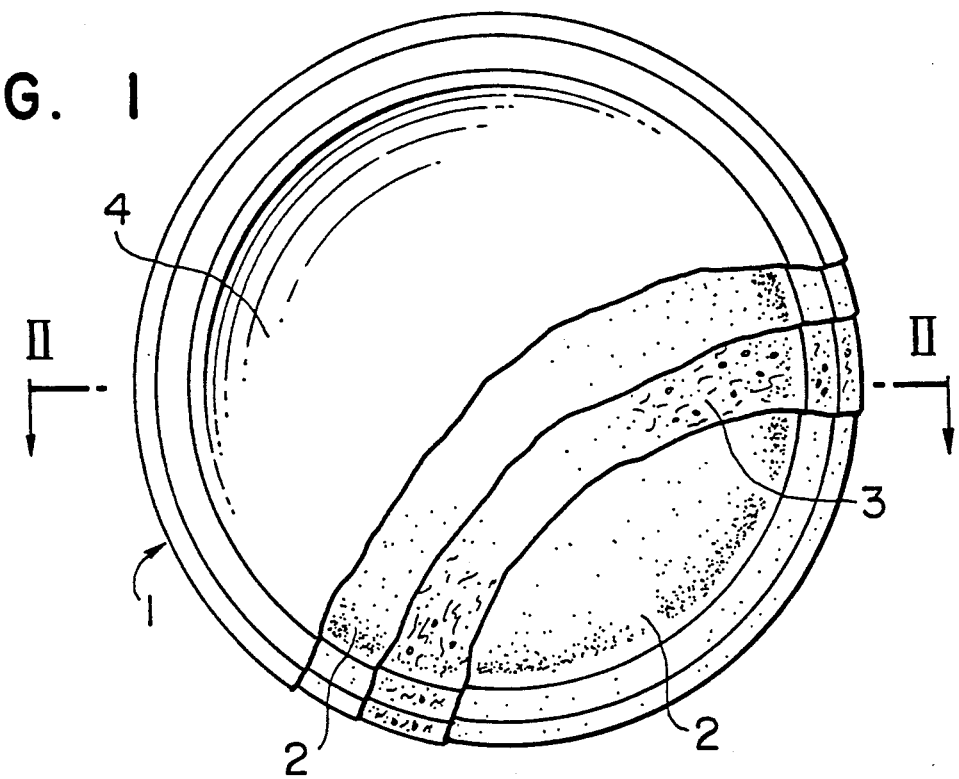
FIG. 1 is a partially cut away front view of a reflector in accordance with one embodiment of the present invention.
Figure 2:
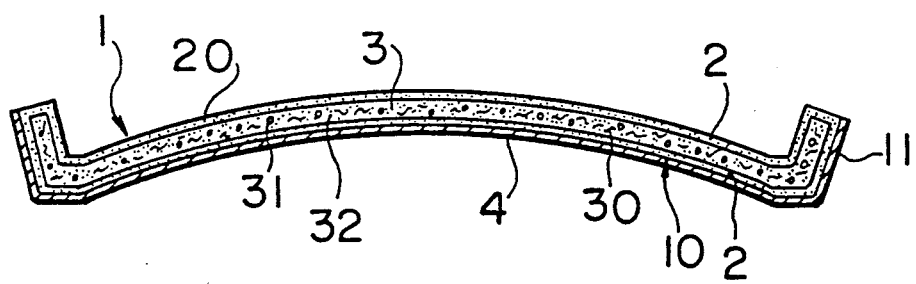
FIG. 2 is a sectional view taken along line II—II of FIG. 1.

Referring to FIGS. 1 and 2, a reflector includes a round reflective plate 1 which has a skin layer 2 and a core layer 3 disposed within the skin layer 2, said skin and core layers 2, 3 being formed by sandwich injection molding. The skin layer 2 includes first synthetic resin 20, and the core layer 3 includes second synthetic resin 32 which has pieces of electric wave reflective material 30 dispersed therein. Pieces of the electric wave reflective material 30 may be in the form of fibers, flakes and particles. The second synthetic resin 32 may also have a blowing agent 31 included therein. The parabolic surface 10 of the reflective plate 1 is coated with a protective coating 4. Reference numeral 11 denotes a flange, for example, adapted to be fixed to a holding member (not shown).

The terms fiber, flake and particle are used herein with the following meanings. A fiber is defined as an elongated member having any transverse cross-sectional shape. A flake is a flattened member having a periphery of any shape. A particle is defined as a member having not only the variety of shapes that the flake can assume in two dimensions, but whereas the flake is flat, the particle can be of any shape in its height dimensions, so that its shape can be variable in three dimensions.

In the reflector shown in FIGS. 1 and 2, electric waves are reflected by the core layer 3 having fibrous electric wave reflective material 30 of the reflective plate 1.

Figure 3:
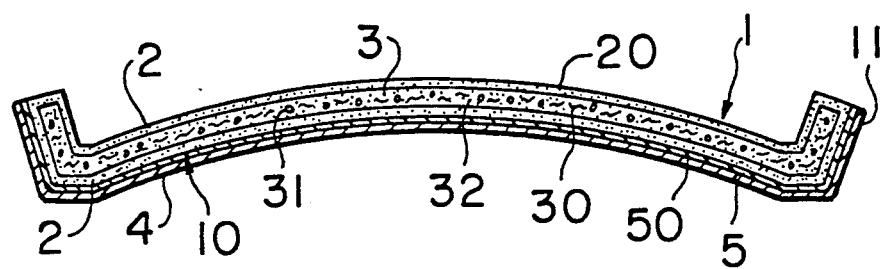
FIG. 3 is a sectional view similar to FIG. 2, but illustrating a reflector in accordance with another embodiment of the present invention.

Next, in FIG. 3, the parabolic surface 10 of the reflective plate 1 is coated with a conductive coating 5, and the parabolic surface 50 of the conductive coating 5 is coated with the protective coating 4. The reflector shown in FIG. 3 has a higher reflectivity because of the conductive coating 5.

Figure 4:
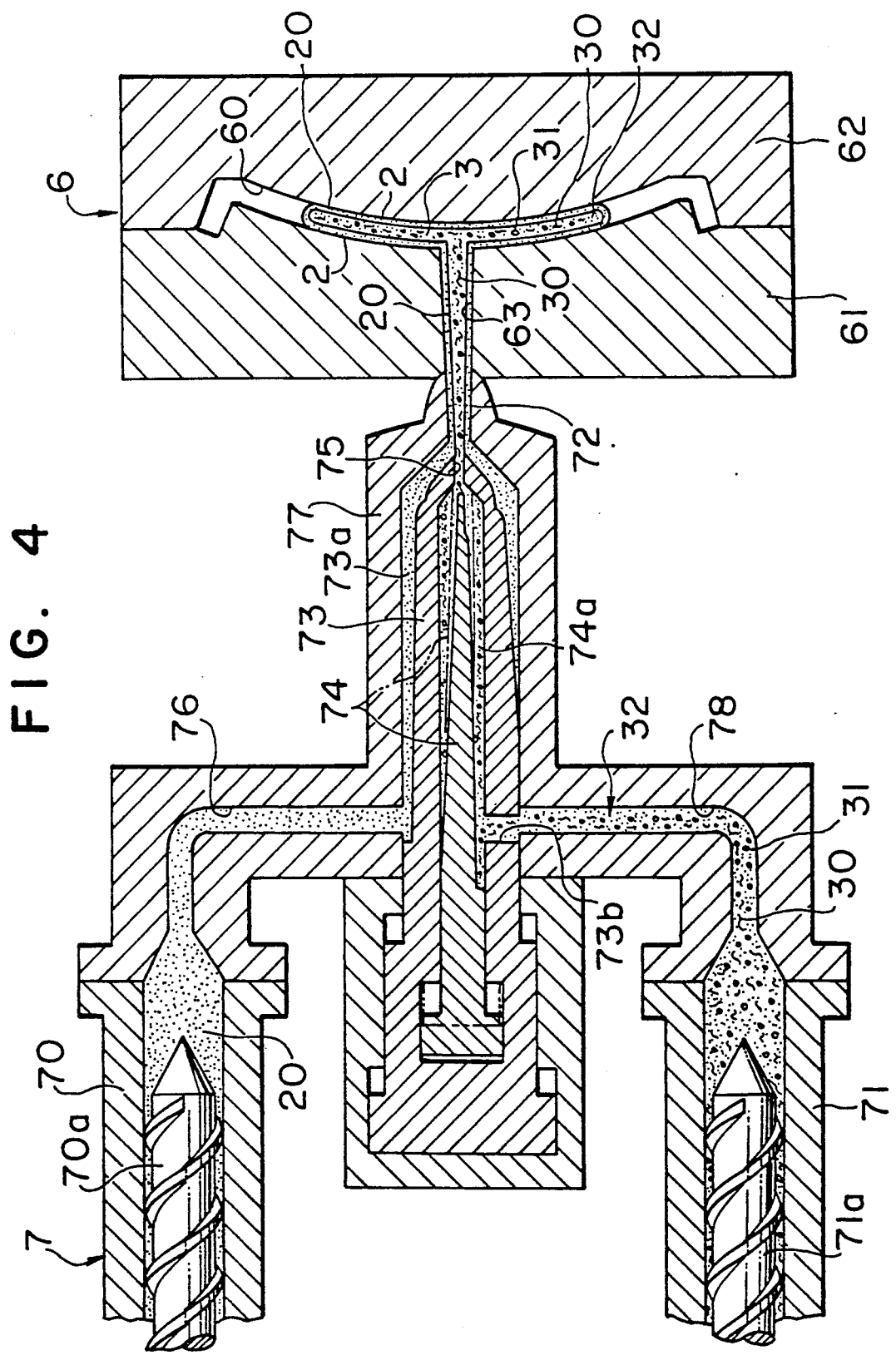
FIG. 4 is a sectional view of a manufacturing machine performing a method of manufacturing a reflector in accordance with the present invention.

FIG. 4 shows a manufacturing machine of a reflector.

Reference numeral 6 denotes an injection mold for forming a reflector which includes a stationary mold 61 and a movable mold 62 which cooperate with each other in forming a cavity 60. The stationary mold 61 has a sprue 63 therein which passes from the outside to the cavity 60.

Reference numeral 7 denotes a sandwich injection molding machine which has a first cylinder 70, a second cylinder 71 and a common cylinder 77. The first cylinder 70 has a rotatable screw plunger 70a therein, the rotation of which causes first synthetic resin 20 to be injected through a passage 76. Similarly, the second cylinder 71 has a rotatable screw plunger 71a therein, the rotation of which causes second synthetic resin 32 to be injected through a passage 78. As mentioned above, the second synthetic resin 32 has fibrous electric wave reflective material 30 and a blowing agent 31 (for example, sodium bicarbonate ($NaHCO_3$)).

The common cylinder 77 has an injection nozzle 72 formed at the end thereof which communicates with the sprue 63 of the stationary mold 61. The common cylinder 77 has a first plunger 73 therein which is arranged to be longitudinally moved to open or close the nozzle 72 of the common cylinder 77. A chamber 73a formed between the first plunger 73 and the common cylinder 77 communicates with the first cylinder 70 through the passage 76. The first plunger 73 has an injection nozzle 75 formed at the end thereof which communicates with the chamber 73a. The first plunger 73 has a second plunger 74 therein which is arranged to be longitudinally moved to open or close the nozzle 75 of the first cylinder 73. A chamber 74a formed between the second plunger 74 and the first plunger 73 communicates with the second cylinder 71 through a hole 73b of the first plunger 73 and the passage 78.

The operation of the manufacturing machine is as follows:

The first plunger 73 is leftwardly moved to open the nozzle 72, and the second plunger 74 is rightwardly moved to close the nozzle 75. The screw plunger 70a of the first cylinder 70 is rotated to inject the first synthetic resin 20 in the melted state (200° to 280° C.) through the passage 76, the chamber 73a, the nozzle 72, and the sprue 63 into the cavity 60 (30° to 80° C.).

After a time period of 1 to 3 seconds has elapsed, the second plunger 74 is leftwardly moved to open the nozzle 75. The screw plunger 71a of the second cylinder 71 is rotated to inject the second synthetic resin 32 in the melted state (200° to 280° C.) through the passage 78, the hole 73b, the chamber 74a, the nozzle 75, the chamber 73a, the nozzle 72, and the sprue 63 into the cavity 60. At this time, since the first synthetic resin 20 is also injected from the first cylinder 70, the first synthetic resin 20 and second synthetic resin 32 are simultaneously injected into the cavity 60 with the second synthetic resin 32 disposed within the first synthetic resin 20. Namely, the second synthetic resin 32 is injected into the cavity 60 to expand the first synthetic resin 20 toward the inner wall of the cavity 60.

After a time period of 3 to 10 seconds has elapsed, the second plunger 74 is rightwardly moved to close the nozzle 75. The screw plunger 71a of the second cylinder 71 is stopped to prevent the second synthetic resin 32 from being injected. However, the first plunger 73 remains in the position where the nozzle 72 is open. The screw plunger 70a of the first cylinder 70 continues to be rotated to inject the first synthetic resin 20.

After a time period of 0.1 to 5 seconds, the first plunger 73 is rightwardly moved to close the nozzle 72. The screw plunger 70a of the first cylinder 70 is stopped to prevent the first synthetic resin 20 from being injected. This is the end of the injection molding.

After the first synthetic resin 20 and the second synthetic resin 32 have been cooled to be hardened, the movable mold 62 is moved away from the stationary mold 61. Thus, the reflective plate 1 (see FIGS. 1, 2 and 3) is completed with the parabolic surface 10 and the flange 11.

According to the above method, it takes 60 to 120 seconds to complete the reflective plate 1 (from the start of injection to the end of injection, including the time period for cooling of the synthetic resin, opening of the mold, and ejecting the reflective plate 1).

The completed reflective plate 1 is of a sandwich construction which has the skin layer 2 and the core layer 3 disposed within the skin layer 2, said skin layer 2 including the first synthetic resin 20, and the core layer 3 including the second synthetic resin 32 which has in it the blowing agent 31 and the pieces of the electric wave reflective material 30.

Then, as mentioned above, the parabolic surface 10 of the reflective plate 1 is coated with the protective coating 4 (FIG. 2). Alternatively, the parabolic surface 10 of the reflective plate 1 is coated with the conductive coating 5, and the parabolic surface 50 of the conductive coating 5 is coated with the protective coating 4.

In the above-described reflective plate 1, the first synthetic resin 20 and the second synthetic resin 32 may be identical to or different from each other in material, and may be one or a combination of at least two selected from a group comprising modified PPO (polyphenylene oxide), modified PPE (polyphenylene ether), alloy of modified PPE and polyamide, heat-resistant ABS (acrylonitrile butadiene styrene) resin, polypropylene, composite material of polypropylene and inorganic material (for example, sodium carbonate).

The electric wave reflective material pieces 30 may be any material capable of satisfactorily reflecting electromagnetic wave signals. Examples are nickel coated carbon, stainless steel, brass, and aluminum. The material is preferably made of corrosion resistant material because it should maintain stable reflectivity characteristics despite the antenna being exposed to the elements. The dimensions of the electric wave reflective material pieces can be any that, combined with the shape, can be dispersed in a synthetic resin and injection molded in accordance with the principles of this invention.

The protective coating 4 may be urethane series coating, epoxy series coating, acryl series coating, or fluorine coating, such as PVDF (polyvinylidene fluoride resin). The conductive coating 5 may be nickel series coating, copper series coating, aluminum series coating, or silver series coating.

The second synthetic resin 32 having the electric wave reflective material pieces 30 dispersed therein is manufactured as follows: the electric wave reflective material pieces made of stainless steel, aluminum, or nickel coated carbon etc. are mixed with the second synthetic resin (ABS, PP, modified PPO, or modified PPE etc.), and they are processed into a pellet by a pelletizer.

Experiment

Reflectivity was measured for the second synthetic resin having the electric wave reflective material pieces dispersed therein. ABS was selected as the second synthetic resin, and as the reflective material, stainless steel and nickel coated carbon in fiber form were selected. The device used for measuring reflectivity was the type BEKISCAN instrument made by BEKAERT in Belgium.

TABLE

| kind of reflective material | amount of reflective material (wt. %) | | | |
|---|---|---|---|---|
| | 4% | 5% | 8% | 10% |
| stainless steel fiber | 70~80% | 80~85% | 90~95% | 95%~ |
| nickel coated carbon fiber | 85~90% | 90~92% | 94~96% | 97%~ |

Considering that reflectivity of at least about 95% is preferable for a reflector of a satellite broadcasting receiving parabolic antenna, reflective material constituting at least about 8% by weight of the material forming the antenna is preferably used.

Extensive testing has revealed that the preferred electric wave reflective material is a corrosion resistant steel. When pieces in the shape of a fiber are used, the width of the fibers is 10 to 500 microns, and can be 0.5 to 200 mm in length. The preferred length of the fiber is between 0.5 mm and 50 mm, and most preferably between 0.5 mm and 30 mm.

Dimensions for the electric wave reflective material pieces in the form of fibers have been provided above. Flakes forming such pieces can be portions of a thin film, such pieces having any shape within the dimensions of 2 microns to 30 microns for the length and width. Likewise, particles can be sized between 2 and 30 microns for any of the three dimensions of width, length and height. While specific dimensions and shapes for pieces of an electric wave reflective material have been mentioned above, a key aspect of the present invention is to provide an injection molding process for a reflector of a parabolic antenna that forms a skin layer made of a synthetic resin, together with a core layer made of a synthetic resin combined with pieces of a reflective material. Therefore, any reflective material and pieces thereof in any shape and size can be used as long as the following conditions are met: (a) it is possible to satisfactorily mix the reflective material pieces for dispersal in a synthetic resin, (b) the mixture can be used in an injection molding apparatus to form the reflector, and (c) satisfactory reflectivity characteristics can be achieved.

Further, although the synthetic resin of the core layer includes a blowing agent in the embodiment discussed above, a reflector according to the present invention can be accomplished without a blowing agent in the synthetic resin of the core layer.

The invention has thus been shown and described with reference to specific embodiments. However, it should be noted that the invention is in no way limited to the details of the illustrated structures, but that changes and modifications may be made without departing from the scope of the appended claims.

I claim:

1. A method of manufacturing a reflector of a satelite broadcasting receiving parabolic antenna having a reflectivity rate of at least 90%, comprising the steps of:
   providing a first melted synthetic resin;
   providing a second melted synthetic resin having pieces of an electric wave reflective material dispersed therein, the amount of said electric wave reflective material being 4 to 10% by weight and sufficient to provide said reflectivity rate of at least 90%, said pieces of said electric wave reflective material being in the shape of fibers each of which has a width of 10 to 500 microns and a length of 0.5 mm to 200 mm;
   forming a skin layer for the reflector by injecting the first melted synthetic resin into a mold cavity; and
   forming a core layer enclosed within said skin layer by injecting into said mold cavity the second melted synthetic resin with the electric wave reflective material pieces dispersed therein.

2. The method of claim 1, wherein the core layer forming step comprises injecting into the mold cavity the second melted synthetic resin with the electric wave reflective material pieces dispersed therein while it is disposed within the first melted synthetic resin which itself is being injected into the mold cavity.

3. The method of claim 1, wherein said fibers have a length of 0.5 mm to 50 mm.

4. The method of claim 1, wherein said fibers have a length of 0.5 mm to 30 mm.

5. The method of claim 1, wherein the electric wave reflective material is a corrosion resistant material.

6. The method of claim 1, wherein the amount of said electric wave reflective material used in the second melted synthetic resin is approximately 8% by weight.

7. The method of claim 1, further comprising the step of coating the parabolic surface of the reflector with a protective coating.

8. The method of claim 1, further comprising the step of coating the parabolic surface of the reflector with a conductive coating.

9. The method of claim 8, further comprising the step of coating the conductive coating with a protective coating.

10. The method of claim 1, further comprising the step of dispersing a blowing agent in said second melted synthetic resin.

11. A method of manufacturing a reflector of a satellite broadcasting receiving parabolic antenna having a reflectivity rate of at least 90%, comprising the steps of:
   providing a first melted synthetic resin;
   providing a second melted synthetic resin having a piece of an electric wave reflective material dispersed therein, the amount of said electric wave reflective material being 4 to 10% by weight and sufficient to provide said reflectivity rate of at least 90%, said pieces of said electric wave reflective material being in the shape of flakes each of which has the dimensions of 2 microns to 30 microns in width and length;
   forming a skin layer for the reflector by injecting the first melted synthetic resin into a mold cavity; and
   forming a core layer enclosed within said skin layer by injecting into said mold cavity the second melted synthetic resin with the electric wave reflective material pieces dispersed therein.

12. The method of claim 11, wherein the core layer forming step comprises injecting into the mold cavity the second melted synthetic resin with the electric wave reflective material pieces dispersed therein while it is disposed within the first melted synthetic resin which itself is being injected into the mold cavity.

13. The method of claim 11, wherein the electric wave reflective material is a corrosion resistant material.

14. The method of claim 11, wherein the amount of said electric wave reflective material used in the second melted synthetic resin is approximately 8% by weight.

15. The method of claim 11, further comprising the step of coating the parabolic surface of the reflector with a protective coating.

16. The method of claim 11, further comprising the step of coating the parabolic surface of the reflector with a conductive coating.

17. The method of claim 16, further comprising the step of coating the conductive coating with a protective coating.

18. The method of claim 11, further comprising the step of dispersing a blowing agent in said second melted synthetic resin.

19. A method of manufacturing a reflector of a satellite broadcasting receiving parabolic antenna having a reflectivity rate of at least 90%, comprising the steps of:
   providing a first melted synthetic resin;
   providing a second melted synthetic resin having pieces of an electric wave reflective material dispersed therein, the amount of said electric wave reflective material being 4 to 10% by weight and sufficient to provide said reflectivity rate of at least 90%, said pieces of said electric wave reflective material being in the shape of particles each of which has the dimensions of 2 microns to 30 microns for any of its width, length and height;
   forming a skin layer for the reflector by injecting the first melted synthetic resin into a mold cavity; and
   forming a core layer enclosed within said skin layer by injecting into said mold cavity the second melted synthetic resin with the electric wave reflective material pieces dispersed therein.

20. The method of claim 19, wherein the core layer forming step comprises injecting into the mold cavity the second melted synthetic resin with the electric wave reflective material pieces dispersed therein while it is disposed within the first melted synthetic resin which itself is being injected into the mold cavity.

21. The method of claim 19, wherein the electric wave reflective material is a corrosion resistant material.

22. The method of claim 19, wherein the amount of said electric wave reflective material used in the second melted synthetic resin is approximately 8% by weight.

23. The method of claim 19, further comprising the step of coating the parabolic surface of the reflector with a protective coating.

24. The method of claim 19, further comprising the step of coating the parabolic surface of the reflector with a conductive coating.

25. The method of claim 24, further comprising the step of coating the conductive coating with a protective coating.

26. The method of claim 19, further comprising the step of dispersing a blowing agent in said second melted synthetic resin.

* * * * *